United States Patent Office 3,579,497
Patented May 18, 1971

3,579,497
WATER-INSOLUBLE MONOAZO DYESTUFFS
Visvanathan Ramanathan, Basel, and Klaus Artz, Muttenz, Switzerland, assignors to Ciba Limited, Basel, Switzerland
No Drawing. Filed Oct. 31, 1967, Ser. No. 679,522
Claims priority, application Switzerland, Nov. 7, 1966, 16,002/66
Int. Cl. C09b 29/06; D06p 1/02
U.S. Cl. 260—158                               10 Claims

ABSTRACT OF THE DISCLOSURE

Water-insoluble monoazo dyestuffs of the formula

A—N=N—B in which A represents a benzene radical or a heterocyclic radical and B represents a benzene radical containing an amino group in para-position to the azo group, one of the hydrogen atoms of the amino group being replaced by an alkyl radical that may be substituted and the other being replaced by a phenalkyl radical bearing a negative substituent. The compounds are suitable for dyeing and painting materials such as fibers and fabrics.

---

The present invention provides, as new compounds, water-insoluble monoazo dyestuffs of the formula

A—N=N—B in which A represents a benzene radical or a heterocyclic radical and B represents a benzene radical containing an amino group in para-position to the azo group, one of the hydrogen atoms of the amino group being replaced by an alkyl radical that may be substituted and the other being replaced by a phenalkyl radical bearing a negative substituent.

Dyestuffs which are of special interest are those of the formula

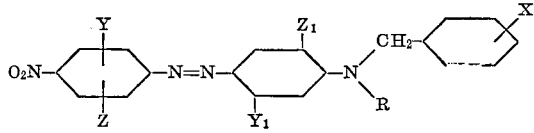

in which Y represents a hydrogen or a halogen atom or an alkyl, alkoxy, phenoxy, nitro, cyano, alkylsulphonyl or carbalkoxy group, Z represents a hydrogen or a halogen atom or an alkyl, cyano or trifluoromethyl group, X represents a nitro, cyano, carbalkoxy, carbamido, alkylsulphonyl or trifluoromethyl group, $Y_1$ represents a hydrogen or a halogen atom or an alkyl, alkoxy or acylamino group, $Z_1$ represents a hydrogen atom or an alkyl or alkoxy group and R represents an alkyl group that may be substituted by a hydroxyl, alkoxy, cyanoalkoxy, acyloxy, cyano, carbalkoxy or carbamido group.

The new dyestuffs may be obtained by coupling a diazo compound of an aminobenzene or a heterocyclic amine with an aniline in which one of the hydrogen atoms of the amino group is replaced by an alkyl radical that may be substituted and, the other is replaced by a phenalkyl residue bearing a negative substituent.

The diazo components used are preferably aminobenzenes of the formula

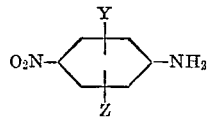

in which Y and Z have the meanings given above. The following amines may be mentioned as examples:

aminobenzene,
1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene,
1-amino-2-carbomethoxy-4-chlorobenzene,
1-amino-2-carbomethoxy-4-nitrobenzene,
1-amino-2-chloro-4-cyanobenzene,
1-amino-2-chloro-4-nitrobenzene,
1-amino-2-phenoxy-4-nitrobenzene,
1-amino-2-chloro-4-carbethoxybenzene,
1-amino-2-chloro-4-methylsulphonylbenzene,
1-amino-2-methylsulphonyl-4-chlorobenzene,
1-amino-2-methylsulphonyl-4-nitrobenzene,
1-amino-2,4-dinitrobenzene,
1-amino-2,4-dicyanobenzene,
1-amino-2-cyano-4-methylsulphonylbenzene,
1-amino-2,6-dichloro-4-cyanobenzene,
1-amino-2,6-dichloro-4-nitrobenzene,
1-amino-2,4-dicyano-6-chlorobenzene,
1-amino-2,4-dinitro-6-chlorobenzene and especially
1-amino-2-cyano-4-nitrobenzene and
1-amino-2-chlorobenzene-4-sulphodimethylamide.

A compound which is of special interest is 1-amino-2-cyano-4-nitrobenzene.

With regard to heterocyclic diazo components, special mention may be made of 2-amino-5-nitrothiazole; other compounds of this series which are suitable are, for example, as follows:

2-aminothiazole,
2-amino-5-nitrothiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
2-amino-6-chlorobenzthiazole,
2-amino-6-cyanobenzthiazole,
2-amino-6-nitrobenzthiazole,
2-amino-6-methylsulphonylbenzthiazole,
2-amino-1,3,4-thiadiazole and
2-amino-4-phenyl-1,3,5-thiadiazole.

The coupling components used in the process of the invention preferably correspond to the formula

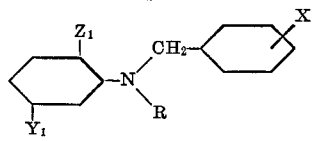

in which X, $Y_1$, $Z_1$ and R have the meanings given above. The following amines may be mentioned as examples:

N-para-nitrobenzyl-N-ethylaniline,
N-para-nitrobenzyl-N-cyanoethylaniline,
N-para-nitrobenzyl-N-methoxyethylaniline,
N-para-nitrobenzyl-N-cyanoethoxyethylaniline,
N-meta-nitrobenzyl-N-cyanoethylaniline,
N-meta-nitrobenzyl-N-carbomethoxyethylaniline, N-ortho-nitrobenzyl-N-cyanoethylaniline,
N-para-cyanobenzyl-N-ethylaniline,
N-para-cyanobenzyl-N-cyanoethylaniline,
N-para-cyanobenzyl-N-carbomethoxyethylaniline,
N-para-cyanobenzyl-N-cyanoethoxyethylaniline,
N-para-cyanobenzyl-N-methoxyethylaniline,
N-meta-carbomethoxybenzyl-N-cyanoethylaniline,
N-para-carbomethoxybenzyl-N-cyanoethylaniline,
N-para-carbomethoxybenzyl-N-cyanoethoxyethylaniline,
N-para-carbomethoxybenzyl-N-methoxyethylaniline,
3-methyl-N-paranitrobenzyl-N-cyanoethylaniline,
2-methoxy-5-methyl-N-para-nitrobenzyl-N-cyanoethylaniline,
3-acetylamino-N-para-nitrobenzyl-N-cyanoethylaniline,
3-propionylamino-N-para-nitrobenzyl-N-cyanoethylaniline,
N-para-nitrophenethyl-N-cyanoethoxyethylaniline and
3-acetylamino-N-para-nitrophenethyl-N-cyanoethylaniline.

Diazotization of the diazo components may be carried out by methods known per se, for example, with the aid of a mineral acid, especially hydrochloric acid, and sodium nitrite, or, for example, with a solution of nitrosyl-sulphuric acid in concentrated sulphuric acid.

Coupling may also be carried out by a known method, for example, in a neutral to acid medium, if necessary, in the presence of sodium acetate or a similar buffer which influences the rate of coupling, or a catalyst, for example, pyridine or a salt thereof.

Afte rcoupling, the dyestuffs formed can easily be separated from the coupling mixture, for example, by filtration, because they are virtually insoluble in water.

The new dyestuffs are eminently suitable for dyeing and printing materials, especially fibres and fabrics, made, for example, of cellulose triacetate and polyamides, but especially aromatic polyesters. They produce on these materials dyeings possessing excellent properties of fastness, especially excellent fastness to light, sublimation and rubbing. Dyeings produced with these dyestuffs are also suitable for processing in the so-called "permanent-press" process, for example, the "Koratron" process. In this process, for example, a polyester-cotton fabric is treated with a synthetic resin and made up into an article of clothing. The article of clothing is then subjected to a heat treatment for about 14 minutes at 170° C. in a suitable press, during which process the resin is cured. A shape, for example, a crease, imparted to the piece of clothing during this treatment is permanent. Textiles dyed with the new dyestuffs and finished in this manner display excellent properties of wet fastness and excellent thermal stability. Furthermore, the dyestuffs do not bleed onto polyester material or other fabrics because they do not migrate through the synthetic resin finish. Moreover, no change in shade is detectable because the dyestuffs are not modified by the resin finish.

As compared with the comparable dyestuffs described in French patent specification No. 1,450,955, the dyestuffs of the present invention are distinguished by better fastness to sublimation and greater suitability for the "Koratron" process.

For dyeing, the new dyestuffs are advantageously used in a state of fine division, and dyeing is carried out in the presence of a dispersing agent, for example, soap, sulphite cellulose waste liquor or a synthetic detergent, or a combination of different wetting and dispersing agents. Prior to dyeing, it is generally advantageous to convert the dyestuff into a dyeing preparation which contains a dispersing agent and the dyestuff in a form such that a fine dispersion is obtained when the preparation is diluted with water. Such dyestuff preparations may be obtained in known manner, for example, by reprecipitating the dyestuff from sulphuric acid and grinding the suspension so obtained with sulphite cellulose waste liquor. If necessary, they may also be obtained by grinding the dyestuff in a highly efficient grinding device in the dry or wet state in the presence or absence of a dispersing agent.

To obtain stronger dyeings on polyethylene terephthalate fibres it is generally advantageous to add a swelling agent to the dyebath, or more especially to carry out the dyeing process under superatmospheric pressure at a temperature above 100° C., for example, at 120° C. Suitable swelling agents are aromatic carboxylic acids, for example, benzoic acid and salicylic acid; phenols, for example, ortho- or para-hydroxydiphenyl; aromatic halogen compounds, for example, chlorobenzene, ortho-dichlorobenzene and trichlorobenzene; and phenylmethylcarbinol or diphenyl. When carrying out the dyeing process under superatmospheric pressure it is generally advantageous to render the dyebath slightly acidic, for example, by the addition of a weak acid, for example, acetic acid.

By virtue of their fastness to alkali, the new dyestuffs are specially suitable for application by the so-called thermofixation process in which the material to be dyed is impregnated at a temperature not exceeding 60° C. with an aqueous dispersion of the dyestuff which advantageously contains 1 to 50% of urea and a thickening agent, especially sodium alginate, and then squeezed in the usual manner. The impregnated material is advantageously squeezed so as to retain 50 to 100% of its dry weight of dye liquor.

To fix the dyestuff, the material so impregnated is heated to a temperature above 100° C., for example, to a temperature between 180 and 220° C. advantageously after drying, for example, in a current of warm air.

The aforementioned thermofixation process is specially suitable for the dyeing of union fabrics made from polyester fibres and cellulosic fibres, especially cotton. In this case, in addition to the dyestuffs of the invention, the padding liquor contains dyestuffs suitable for dyeing cotton, especially vat dyestuffs, or reactive dyestuffs, that is to say, dyestuffs capable of being fixed on the cellulosic fibre with formation of a chemical bond, for example, dyestuffs which contain a chlorotriazine or chlorodiazine residue. In the latter case, it is generally advantageous to add an agent capable of binding acid to the padding liquor, for example, an alkali metal carbonate, an alkali metal phosphate, an alkali metal borate or an alkali metal perborate, or mixtures theerof. When using vat dyestuffs, the padded fabric must be treated after the heat treatment with an aqueous alkaline solution of one of the reducing agents commonly used in vat dyeing.

By virtue of the fact that the dyestuffs of the invention reserve well on wool, they are eminently suitable for dyeing union fabrics made from polyester fibre and wool.

The dyeings obtained are advantageously subjected to an after-treatment, for example, by heating with an aqueous solution of a non-ionic detergent.

The dyestuffs may also be applied by printing processes. In this method of application a printing paste is used which contains, for example, in addition to the usual printing adjuvants, for example, wetting and thickening agents, the finely divided dyestuff, if necessary, in admixture with one of the above-mentioned cotton dyestuffs, if necessary, together with urea and/or an agent capable of binding acid.

The following examples illustrate the invention. Unless otherwise stated, the parts and percentages are by weight.

EXAMPLE 1

20.3 parts of 3-acetylamino-N-cyanoethylaniline, 20.58 parts of para-nitrobenzyl chloride, 12.6 parts of sodium bicarbonate and 50 parts by volume of chlorobenzene are stirred for 24 hours at 120 to 130° C. The reaction mixture is cooled and then neutralized with acetic acid. The solvent is removed by steam distillation. The aqueous suspension is extracted with ethyl acetate, the ethyl acetate solution is filtered with charcoal until clear and then evaporated. The residue may be used for further processing as it is.

20.7 parts of 2,6-dichloro-4-nitroaniline are dissolved in 100 parts by volume of N-nitrosyl-sulphuric acid and the solution is stirred for some time. The reaction mixture is then discharged on to 500 parts of ice. 33.8 parts of the 3-acetylamino - N - cyanoethyl-N-para-nitrobenzylaniline obtained in the manner described in the preceding paragraph dissolved in 100 parts by volume of glacial acetic acid are slowly added dropwise to this solution at a temperature of 0 to 5° C. The mixture is stirred for 1 hour at 0 to 5° C., diluted with 2,000 parts of iced water, and the batch is stirred for a further 2 hours at 0 to 10° C. The dyestuff is isolated by filtration, washed with water until the washings run neutral and then dried. The dyestuff so obtained, which corresponds to the formula

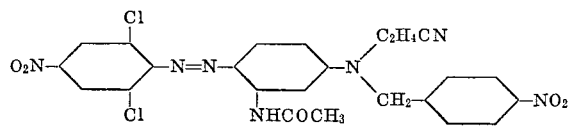

dyes polyester fibres red-brown shades possessing excellent properties of fastness when applied in the form of an aqueous dispersion.

Dyeing procedure 1 part of the dyestuff obtained in the manner described in the above example is ground wet in 2 parts of a 50% aqueous solution of the sodium salt of dinaphthylmethane-2,2'-disulphonic acid and the batch is then dried.

The dyestuff preparation so obtained is mixed with 40 parts of a 10% aqueous solution of a condensation product obtained from octadecyl alcohol and 20 mols of ethylene oxide and then 4 parts of a 40% acetic acid solution are added. A dyebath of 4,000 parts is prepared therefrom by dilution with water.

100 parts of cleansed polyester fibre material are entered into this dyebath at 50° C., the temperature is raised to 120 to 130° C. within 30 minutes and dyeing is carried out for one hour at that temperature in a closed vessel. The material is then well rinsed. A strong, red-brown dyeing possessing excellent fastness to light and sublimation is obtained.

The following table lists components for further dyestuffs. The dyestuffs may be obtained by diazotizing the diazo components shown in Column II and coupling the diazo compounds so obtained with the coupling components in Column III. The shade obtained on polyester fibres is indicated in Column IV.

| | II | III | IV |
|---|---|---|---|
| 2 | $O_2N$-⟨⟩-$NH_2$ with CN | ⟨⟩-N($C_2H_4CN$)($CH_2$-⟨⟩-$NO_2$) with $NHCOCH_3$ | Ruby. |
| 3 | $O_2N$-⟨⟩-$NH_2$ with Cl | Same as above | Red. |
| 4 | $O_2N$-⟨⟩-$NH_2$ | ...do... | Scarlet. |
| 5 | $O_2N$-⟨⟩-$NH_2$ with Cl, Cl | ⟨⟩-N($C_2H_4CN$)($CH_2$-⟨⟩-$NO_2$) | Yellow-brown. |
| 6 | Same as above | ⟨⟩-N($C_2H_4OC_2H_4CN$)($CH_2$-⟨⟩-$NO_2$) | Brown. |
| 7 | $O_2N$-⟨⟩-$NH_2$ with CN | Same as above | Red. |
| 8 | $O_2N$-⟨⟩-$NH_2$ with Cl | ⟨⟩-N($C_2H_4OCH_3$)($CH_2$-⟨⟩-$NO_2$) | Red. |
| 9 | $O_2N$-⟨⟩-$NH_2$ with CN | Same as above | Red. |
| 10 | Same as above | ⟨⟩-N($C_2H_4OCH_3$)($CH_2$-⟨⟩-$NO_2$) | Red. |
| 11 | ...do... | ⟨⟩-N($C_2H_4OC_2H_4CN$)($CH_2$-⟨⟩-$NO_2$) | Red. |

TABLE—Continued

| No. | Diazo component | Coupling component | Shade |
|---|---|---|---|
| 12 | 2,6-dichloro-4-nitroaniline | Same as above | Yellow-brown. |
| 13 | Same as above | N-(2-cyanoethyl)-N-(4-nitrobenzyl)aniline | Yellow-brown. |
| 14 | do | N-(2-cyanoethyl)-N-(4-nitrobenzyl)-3-acetamidoaniline | Brown. |
| 15 | 2-amino-4-nitrobenzonitrile | Same as above | Claret. |
| 16 | 2-amino-4-nitrophenyl methyl sulfone | do | Red. |
| 17 | 2,6-dichloro-4-nitroaniline | N-(2-methoxyethyl)-N-(4-cyanobenzyl)aniline | Brown. |
| 18 | 2-chloro-4-nitroaniline | Same as above | Scarlet. |
| 19 | 2,6-dichloro-4-nitroaniline | N-(2-cyanoethoxyethyl)-N-(4-cyanobenzyl)aniline | Brown. |
| 20 | 2-chloro-4-nitroaniline | Same as above | Red. |
| 21 | Same as above | N-(2-cyanoethyl)-N-(4-cyanobenzyl)-3-acetamidoaniline | Red. |
| 22 | 4-nitroaniline | Same as above | Scarlet. |
| 23 | 2-amino-4-nitrobenzonitrile | do | Claret. |
| 24 | 2,6-dichloro-4-nitroaniline | do | Brown. |
| 25 | 2-amino-6-nitrobenzothiazole | do | Claret. |
| 26 | 2-amino-6-cyanobenzothiazole | do | Red. |
| 27 | 2-amino-5-nitrothiazole | do | Violet. |

TABLE—Continued

| | Diazo component | Coupler | Color |
|---|---|---|---|
| 28 | O₂N—⌬—NH₂ (with —O—⌬—SO₂CH₃ substituent) | ……do…… | Scarlet. |
| 29 | O₂N—⌬—NH₂ (Cl substituent) | ……do…… | Ruby. |
| 30 | O₂N—⌬—NH₂ (with Cl, Cl substituents) | ⌬—N(C₂H₄OC₂H₄CN)(CH₂—⌬—CN), NHCOCH₃ | Red-brown. |
| 31 | Same as above | ⌬—N(C₂H₄CN)(CH₂—⌬—CN) | Yellow-brown. |
| 32 | ……do…… | ⌬—N(C₂H₄CN)(CH₂—⌬—COOC₃) | Do. |
| 33 | O₂N—⌬—NH₂ (CN substituent) | ⌬—N(C₂H₄CN)(CH₂—⌬—COOCH₃), NHCOCH₃ | Claret. |
| 34 | NO₂—⌬—NH₂ (NO₂ substituent) | ⌬—N(C₂H₄CN)(CH₂—⌬—NO₂), OC₂H₅, NHCOCH(CH₃)₂ | Blue. |
| 35 | NO₂—⌬—NH₂ (Cl substituent) | ⌬—N(C₂H₄OH)(CH₂—⌬—NO₂), OCH₃, NHCOCH₃ | Violet. |
| 36 | NO₂—⌬—NH₂ (Br, NO₂ substituents) | ⌬—N(C₂H₄CONH₂)(CH₂—⌬—CN), Cl | Red. |
| 37 | NO₂—⌬—NH₂ (CF₃ substituent) | ⌬—N(C₂H₅)(CH₂—⌬—CONH₂), CH₃ | Scarlet. |
| 38 | NO₂—⌬—NH₂ (Cl substituent) | ⌬—N(C₂H₄CN)(CH₂CH₂—⌬—NO₂), NHCOCH₃ | Red. |
| 39 | NO₃—⌬—NH₂ (CN substituent) | ⌬—N(C₂H₄CN)((CH₂)₄—⌬—NO₂) | Red. |
| 40 | Same as above | ⌬—N(C₂H₄OCOCH₃)(CH₂—⌬—NO₂) | Red. |
| 41 | ……do…… | ⌬—N(C₂H₄COOC₂H₅)(CH₂—⌬—COOCH₃) | Red. |

TABLE—Continued

| | | | |
|---|---|---|---|
| 42 | 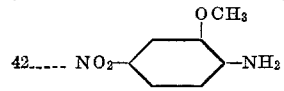 NO$_2$—⬡(OCH$_3$)—NH$_2$ | 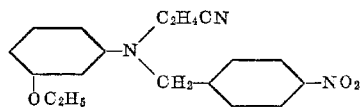 ⬡—N(C$_2$H$_4$CN)(CH$_2$—⬡—NO$_2$), OC$_2$H$_5$ | Orange. |
| 43 | 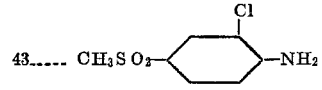 CH$_3$SO$_2$—⬡(Cl)—NH$_2$ | 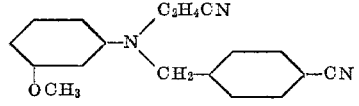 ⬡—N(C$_2$H$_4$CN)(CH$_2$—⬡—CN), OCH$_3$ | Do. |
| 44 | 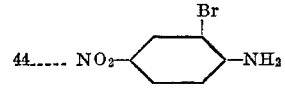 NO$_2$—⬡(Br)—NH$_2$ | 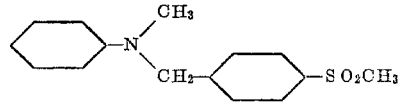 ⬡—N(CH$_3$)(CH$_2$—⬡—SO$_2$CH$_3$) | Scarlet. |
| 45 | Same as above | 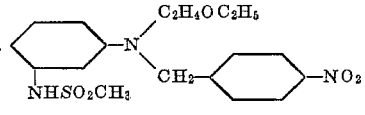 ⬡(NHSO$_2$CH$_3$)—N(C$_2$H$_4$OC$_2$H$_5$)(CH$_2$—⬡—NO$_2$) | Red. |
| 46 | do | 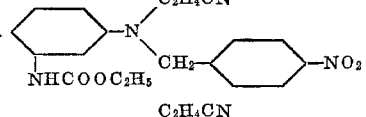 ⬡(NHCOOC$_2$H$_5$)—N(C$_2$H$_4$CN)(CH$_2$—⬡—NO$_2$) | Red. |
| 47 | 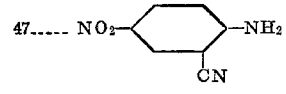 NO$_2$—⬡(CN)—NH$_2$ | 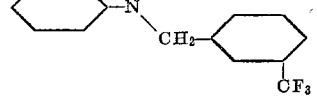 ⬡—N(C$_2$H$_4$CN)(CH$_2$—⬡—CF$_3$) | Scarlet. |
| 48 | Same as above | 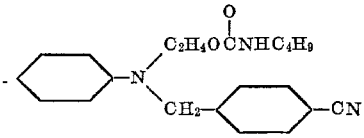 ⬡—N(C$_2$H$_4$OCONHC$_4$H$_9$)(CH$_2$—⬡—CN) | Do. |
| 49 | 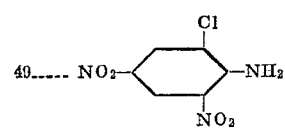 NO$_2$—⬡(Cl)(NO$_2$)—NH$_2$ | 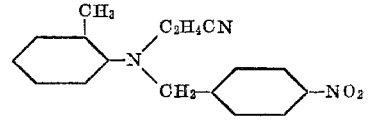 ⬡(CH$_3$)—N(C$_2$H$_4$CN)(CH$_2$—⬡—NO$_2$) | Do. |
| 50 | 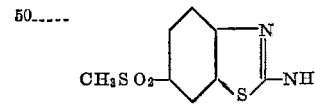 CH$_3$SO$_2$—benzothiazole—NH$_2$ | 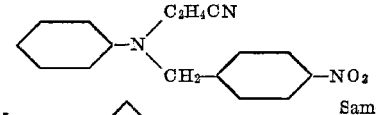 ⬡—N(C$_2$H$_4$CN)(CH$_2$—⬡—NO$_2$) | Red. |
| 51 | 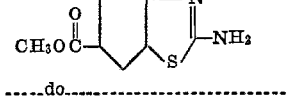 CH$_3$OC(O)—benzothiazole—NH$_2$ | Same as above | Red. |
| 52 | 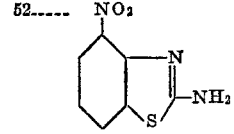 NO$_2$-benzothiazole-NH$_2$ | do | Orange. |
| 53 | 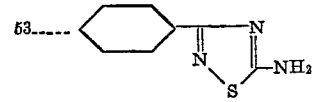 ⬡—thiadiazole—NH$_2$ | do | Scarlet. |
| 54 | 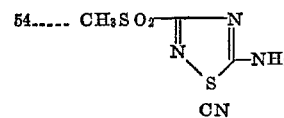 CH$_3$SO$_2$—thiadiazole—NH$_2$ | do | Do. |
| 55 | 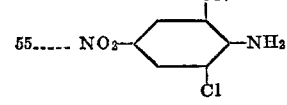 NO$_2$—⬡(CN)(Cl)—NH$_2$ | do | Blue-red. |
| 56 | 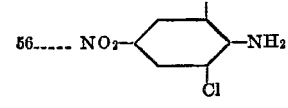 NO$_2$—⬡(Cl)(Cl)—NH$_2$ | 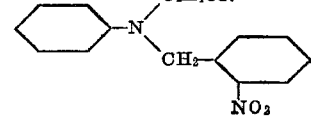 ⬡—N(C$_2$H$_4$CN)(CH$_2$—⬡—NO$_2$) | Orange. |

TABLE—Continued

| | | | |
|---|---|---|---|
| 57 | $O_2N-\langle\text{ring, CN}\rangle-NH_2$ | Same as above | Scarlet. |
| 58 | Same as above | $\langle\text{ring}\rangle-N(C_2H_4CN)(CH_2-\langle\text{ring}\rangle-NO_2)$, NHCOCH$_3$ | Red. |
| 59 | $O_2N-\langle\text{ring, SO}_2CH_3\rangle-NH_2$ | Same as above | Red. |

EXAMPLE 60

19.0 parts of N-cyanoethoxyethylaniline, 20.6 parts of paranitrobenzyl chloride, 16.8 parts of sodium bicarbonate and 50 parts by volume of chlorobenzene are stirred for 24 hours at 120 to 130° C. After cooling the reaction mixture it is neutralized with acetic acid and the chlorobenzene is removed by steam distillation. The N-cyanoethoxyethyl-N-para-nitrobenzylaniline is extracted from the aqueous phase with ethyl acetate, the ethyl acetate solution is treated with charcoal and filtered and then dried and evaporated. The residue may be used for further processing as it is.

13.8 parts of 1-amino-4-nitrobenzene are dissolved in 30 parts of water and 30 parts of concentrated hydrochloric acid. 80 Parts of ice are added, followed by 6.9 parts of sodium nitrite and the batch is stirred until the diazo solution is almost colourless. A solution of 32.5 parts of the N-cyanoethoxyethyl-N-para-nitrobenzylaniline obtained as described in the preceding paragraph in 100 parts by volume of glacial acetic acid is added dropwise at 0 to 5° C. to the diazo solution. The batch is stirred for 1 hour at 0 to 5° C. and then 2,000 parts of iced water are added. The batch is stirred for a further 2 hours at 0 to 5° C. and then filtered. The dyestuff of the formula

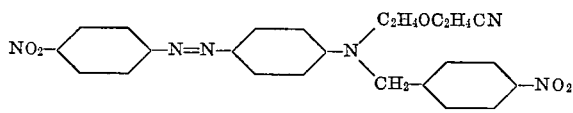

which precipitates is isolated by filtration, washed until the washings run neutral and dried. It dyes polyester fibres reddish orange shades.

EXAMPLE 61

17.5 parts of 2-amino-6-cyanobenzthiazole are dissolved in 250 parts by volume of phosphoric acid at 55° C. The solution is cooled to −10 to −14° C. and then 7.6 parts of sodium nitrate are slowly strewn in. The batch is then stirred for 3 hours at −10 to −14° C. A yellow suspension is obtained which is added to a solution of 27.8 parts of 3-methyl-N-butyl-N-para-cyanobenzylaniline in 380 parts by volume of alcohol cooled to −10° C. The batch is stirred for 90 minutes in an ice bath, 600 parts by volume of iced water are added, the dyestuff of the formula

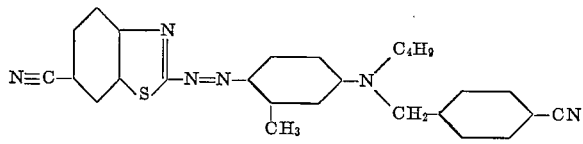

which precipitates is isolated by filtration, washed until the washings run neutral and dried. It dyes polyester fibres red shades possessing excellent properties of fastness.

We claim:

1. A water-insoluble monoazo dyestuff of the formula

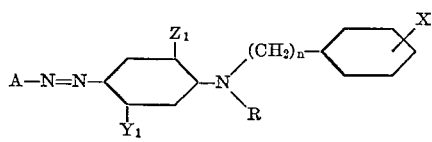

in which A is an unsubstituted 2-thiazole, 2-benzthiazole or 2-thiadiazole radical or a 2-thiazole, 2-benzthiazole or 2-thiadiazole radical substituted by chlorine, nitro, cyano, lower carbalkoxy, lower alkylsulfone or phenyl, or A is a radical of the formula

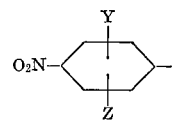

in which Y represnts hydrogen, chlorine, bromine, lower alkyl, lower alkoxy, phenoxy, nitro, cyano, lower carbalkoxy or lower alkylsulphonyl group, Z represnts hydrogen, chlorine, bromine, lower alkyl, cyano or trifluoromethyl group, X represents nitro, cyano, lower carbalkoxy or lower alkylsulphonyl group, $Y_1$ represents hydrogen, chlorine, lower alkyl, lower alkoxy or lower alkanoylamino group, $Z_1$ represents hydrogen, lower alkyl, lower alkoxy group and R represents an unsubstituted lower alkyl group or a lower alkyl group substituted by a lower alkoxy, cyanoethoxy, lower alkanoyloxy, cyano or lower carbalkoxy group and $n$ is an integer from 1 to 4.

2. A water-insoluble monoazo dyestuff as claimed in claim 1 of the formula

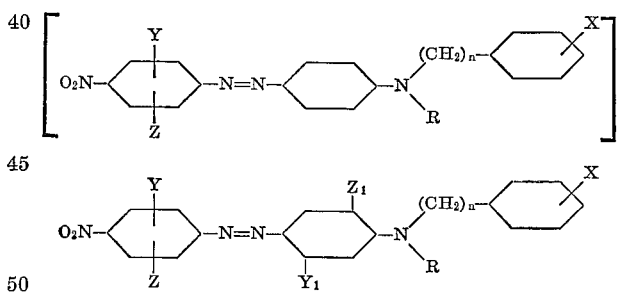

in which Y represents a hydrogen, chlorine, bromine, lower alkyl, lower alkoxy, phenoxy, nitro, cyano, lower carbalkoxy or lower alkylsulphonyl group, Z represents a hydrogen, chlorine, bromine, lower alkyl, cyano or trifluoromethyl group, X represents a nitro, cyano, lower carbalkoxy or lower alkylsulphonyl, $Y_1$ represents a hydrogen, chlorine, lower alkyl, lower alkoxy or lower alkanoylamino group, $Z_1$ represents a hydrogen atom or a lower alkyl or lower alkoxy group and R represents an unsubstituted lower alkyl group or a substituted lower alkyl group wherein the substituent is lower alkoxy, cyano, lower alkanoyloxy, cyano, or lower carbalkoxy and $n$ is an integar from 1 to 4.

3. A water-insoluble monoazo dyestuff as claimed in claim 2, in which R in the formula given represents a cyanoethyl group.

4. A water-insoluble monoazo dyestuff as claimed in claim 1 of the formula

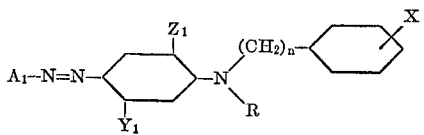

in which $A_1$ is an unsubstituted 2-thiazole, 2-benzthiazole or 2-thiadiazole radical or a 2-thiazole, 2-benzthiazole or 2-thiadiazole radical substituted by chlorine, nitro, cyano, lower carbalkoxy, lower alkylsulfone or phenyl, and X, Y, $Z_1$ R and $n$ have the meanings given in claim 1.

5. A water-insoluble monoazo dyestuff as claimed in claim 1 of the formula

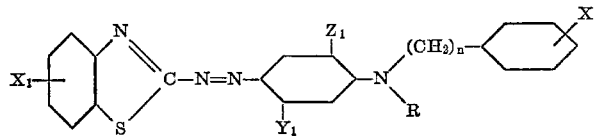

in which $X_1$ is hydrogen, chlorine, nitro, cyano, lower carbalkoxy or lower alkylsulfonyl, X, $Z_1$, $Y_1$ R and $n$ have the meanings given in claim 11.

6. The dyestuff as claimed in claim 1 of the formula

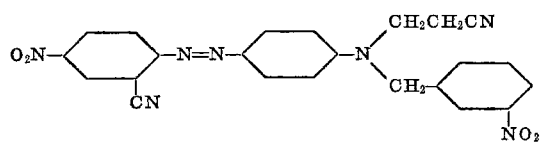

7. The dyestuff as claimed in claim 1 of the formula

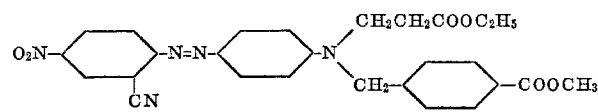

8. The dyestuff as claimed in claim 1 of the formula

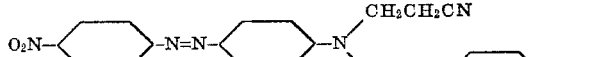

9. The dyestuff as claimed in claim 1 of the formula

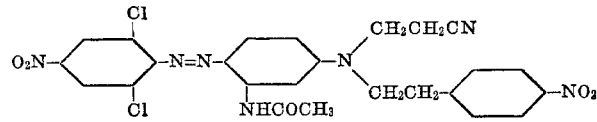

10. The dyestuff as claimed in claim 1 of the formula

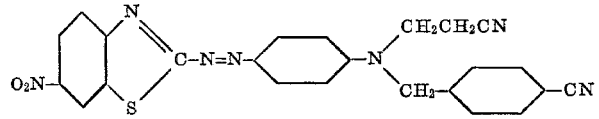

References Cited
FOREIGN PATENTS
1,450,992  7/1966  France _____ 260—158

CHARLES B. PARKER, Primary Examiner
D. M. PAPUGA, Assistant Examiner

U.S. Cl. X.R.
8—41, 54, 55; 260—205, 206, 207.1, 465

UNITED STATES PATENT OFFICE
CERTIFICATE OF CORRECTION

Patent No. 3,579,497      Dated May 18, 1971

Inventor(s) VISVANATHAN RAMANATHAN ET AL

It is certified that error appears in the above-identified patent and that said Letters Patent are hereby corrected as shown below:

Column 14, delete lines 40 through 45.
Column 14, line 63, after "cyano," and before "lower alkanoyloxy," insert --- ethoxy, ---.
Column 15, line 16, delete "11" and insert --- 1 ---.
Column 16, lines 7 through 13, amend the right hand side of the formula to read:

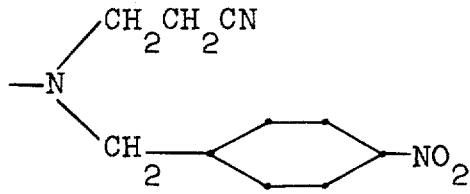

Signed and sealed this 8th day of February 1972.

(SEAL)
Attest:

EDWARD M. FLETCHER, JR.
Attesting Officer

ROBERT GOTTSCHALK
Commissioner of Patents